US010977936B2

(12) United States Patent
Zhang et al.

(10) Patent No.: US 10,977,936 B2
(45) Date of Patent: Apr. 13, 2021

(54) METHOD AND APPARATUS FOR ADAPTIVE ENGAGEMENT OF TEMPORARY TRAFFIC CONTROL MEASURES AND NAVIGATION RESPONSE

(71) Applicant: FORD GLOBAL TECHNOLOGIES, LLC, Dearborn, MI (US)

(72) Inventors: Linjun Zhang, Canton, MI (US); Helen Elizabeth Kourous-Harrigan, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 16/189,545

(22) Filed: Nov. 13, 2018

(65) Prior Publication Data
US 2020/0152056 A1    May 14, 2020

(51) Int. Cl.
G08G 1/01 (2006.01)
G08G 1/08 (2006.01)
G01C 21/34 (2006.01)
G08G 1/081 (2006.01)

(52) U.S. Cl.
CPC ....... G08G 1/0145 (2013.01); G01C 21/3415 (2013.01); G08G 1/0116 (2013.01); G08G 1/08 (2013.01); G08G 1/081 (2013.01); *G01C 21/3492* (2013.01)

(58) Field of Classification Search
CPC ........ G08G 1/0145; G08G 1/016; G08G 1/08; G08G 1/081; G01C 21/3415; G01C 21/3492
See application file for complete search history.

(56) References Cited

U.S. PATENT DOCUMENTS

| 8,121,780 B2 | 2/2012 | Gerdes et al. | |
| 2016/0328965 A1* | 11/2016 | Safer | G08G 1/0129 |
| 2017/0124869 A1* | 5/2017 | Popple | G08G 1/087 |
| 2018/0336781 A1* | 11/2018 | Jin | G08G 1/08 |
| 2019/0103022 A1* | 4/2019 | Kelly | E01F 9/692 |

OTHER PUBLICATIONS https://web.archive.org/web/20150322055732/https://en.wikipedia.org/wiki/Ramp_meter (Year: 2015).*
https://web.archive.org/web/20170921184923/http://66expresslanes.org/about_the_lanes/default.asp (Year: 2017).*
Mei et al., "A Game-Theory Based Incentive Framework for an Intelligent Traffic System as Part of a Smart City Initiative", Sensors 2017, 17, 2874, www.mdpi.com/Journal/Sensors, 19 pages, Switzerland.

* cited by examiner

*Primary Examiner* — Aaron L Troost
(74) *Attorney, Agent, or Firm* — Gregory P. Brown; Brooks Kushman P.C.

(57) ABSTRACT

A system includes a processor configured to receive a plurality of traffic reports corresponding to individual road segments of an interconnected road network of road segments. The processor is also configured to determine a mitigation strategy, utilizing one or more temporary traffic controls existing for the individual road segments, designed to minimize overall traffic congestion on the road network and send control instructions for the one or more temporary traffic controls, instructing control in accordance with the determined mitigation strategy.

9 Claims, 7 Drawing Sheets

METHOD AND APPARATUS FOR ADAPTIVE ENGAGEMENT OF TEMPORARY TRAFFIC CONTROL MEASURES AND NAVIGATION RESPONSE

TECHNICAL FIELD

The illustrative embodiments generally relate to methods and apparatuses for adaptive engagement of temporary traffic control measures and navigation response.

BACKGROUND

Traffic congestion is an ever-increasing problem in areas with population growth. When there is limited public transportation, or when people are spread over a large, not easily serviced area, the common incentive is to drive one's own vehicle. If a road network was not planned to accommodate the current population, a virtually impossible task, lanes that once were wide enough have to adapt to the new traffic patterns.

One solution is to widen roads or add additional arteries, but this is not always a reasonable solution, and it is almost always a very expensive one. Another option is the addition of further traffic signals, which are also expensive, and which may have unintended consequences of creating traffic at certain times, even as they serve to mitigate traffic at other times.

SUMMARY

In a first illustrative embodiment, a system includes a processor configured to receive a plurality of traffic reports corresponding to individual road segments of an interconnected road network of road segments. The processor is also configured to determine a mitigation strategy, utilizing one or more temporary traffic controls existing for the individual road segments, designed to minimize overall traffic congestion on the road network and send control instructions for the one or more temporary traffic controls, instructing control in accordance with the determined mitigation strategy.

In a second illustrative embodiment, a system includes a processor configured to receive congestion data for a plurality of road segments, representing edges in a node graph representative of a road network, wherein nodes in the graph comprise intersections. The processor is also configured to solve an equation for the node graph to constrain congestion over the whole graph according to a predefined goal and considering the impact of engageable temporary traffic control measures to derive a solution. The processor is further configured to send control instructions to a plurality of the temporary traffic control measures that are identified as those to be engaged in order to achieve the solution In a third illustrative embodiment, a method includes receiving notification of an engaged temporary traffic control measure, along a current route, prior to reaching the control measure. The method also includes, responsive to receiving the notification, determining at least two new routes and corresponding projected travel times, one including a change to the current route by traveling in accordance with a new path dictated by the control measure, and another avoiding an intersection including the control measure altogether. Further, the method includes implementing the one of the new routes having a shortest projected travel time as a new current route to replace the current route.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
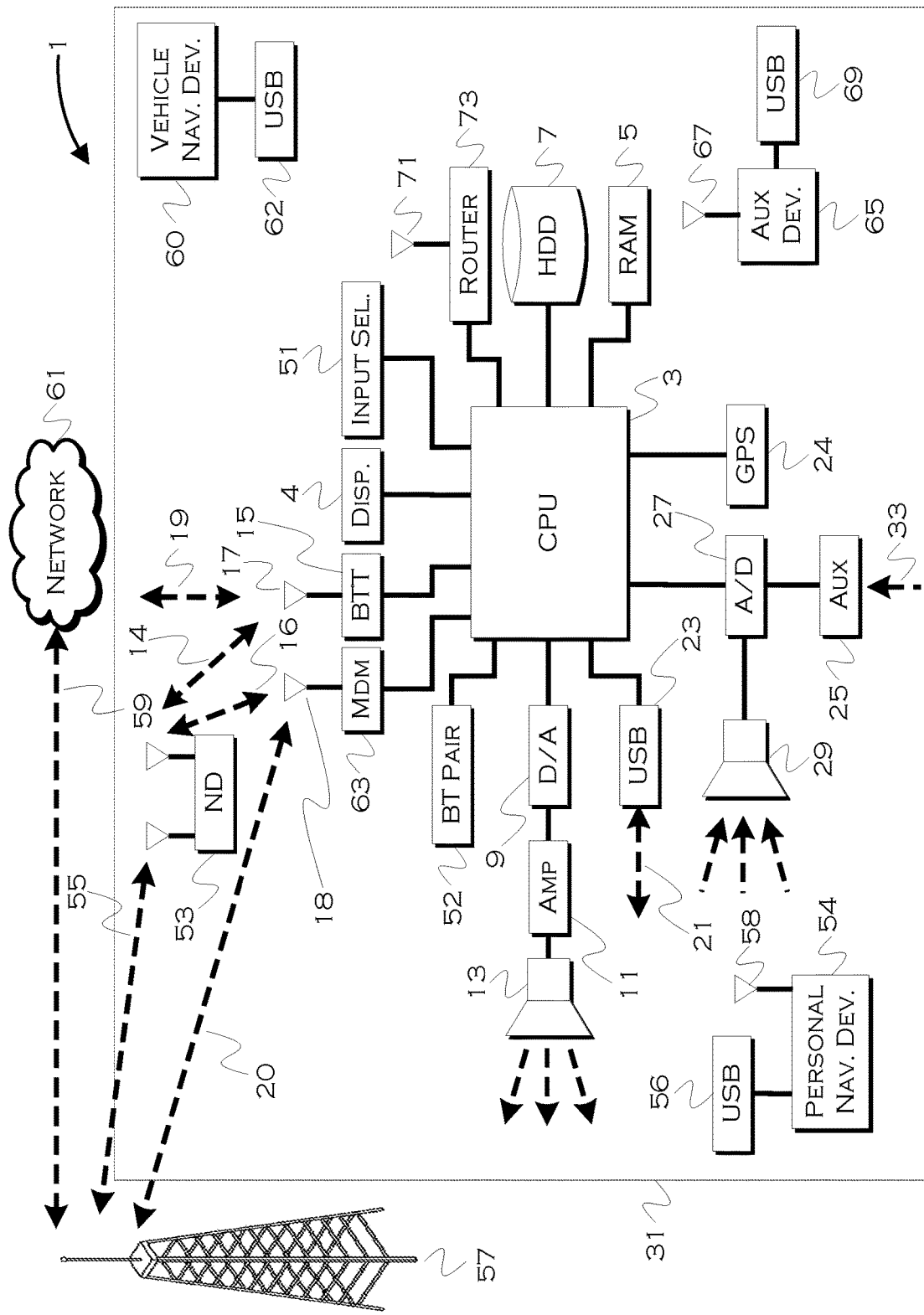
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Road networks are vast, complicated pathway systems that usually result in many potential paths from point A to point B. With modern navigation systems, people typically choose the shortest or fastest route between two points, but this is typically done with respect to distance or projected travel time. Even if a system attempts to accommodate traffic, it is not always clear which road represents a suitable alternative, and in such instances, the navigation system does not consider the impact of a changed route on the overall flow of traffic. For example, if fifty drivers were routed down a small side road, to avoid heavy traffic, this may have the effect of creating even heavier traffic on the side road, or may require all those drivers to make a left turn across traffic at the end of the side road, which may be a time consuming maneuver. If only one vehicle was routed down the road, then a 30 second delay to make such a turn may not be a problem, but if the $47^{th}$ vehicle in line had to wait 23 minutes for the first 46 vehicles to make the turn, the side road may no longer be a viable alternative, and traffic on the side road can become quite heavy quite quickly.

In general, and often because decisions are made from a personal perspective, these systems fail to adequately use the overall accessible road network in an efficient manner. Navigation systems may react to current traffic, but not often, if ever, to projected traffic and not with the intent of using the current vehicle efficiently as a single part of a large moving system.

The illustrative embodiments have the capability to interact with dynamic roadside traffic signals, to actually control the flow of vehicles by changing traffic controls on the fly, to force changes in traffic patterns, and to effectively repurpose less traveled traffic arteries. Decisions can be made to engage, disengage or change timing of control signals, and this can be done with an eye to the eventual effect, as well as to the immediate effect on a single vehicle or a single traffic pattern.

For example, to use the previous side-road example, a system may decide that it would briefly useful to route a small number of vehicle down a side road. To this end, the system may temporarily engage an incentive process (discussed in detail later) or a signal, indicating a requirement to turn down the road from a certain lane. Once a short time period had passed, the system may the shut down the incentive or requirement, until the currently routed traffic cleared from the side road, and continue in this fashion until the main road traffic diminishes, as well as maintaining a reasonably low flow of traffic on the side road, to avoid creating new traffic in an attempt to mitigate current traffic.

Because the system can react to a bigger-picture impact than a localized, single vehicle navigation system, the process can redirect traffic in a manner that both keeps vehicles moving and mitigates existing traffic patterns.

By providing adaptive, reactive and big-picture accommodating traffic control, via repurposable infrastructure, the illustrative embodiments can serve to improve travel time for a whole group of vehicles in a responsible manner (i.e., it attempts to avoid creating excessive additional traffic) that can be much more effective in terms of impact on an overall system.

Figure 2:
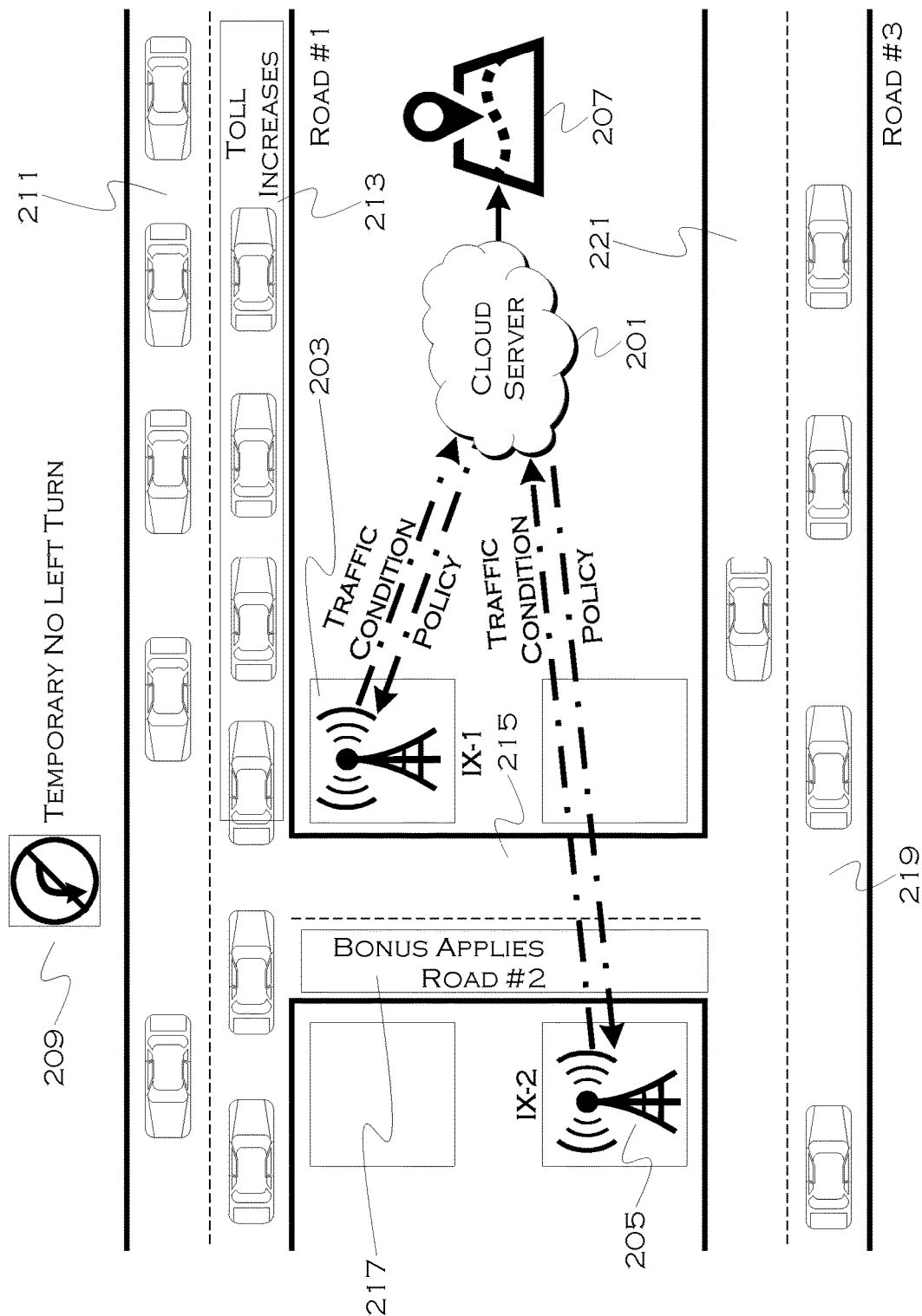
FIG. 2 shows an illustrative example of a small portion of a traffic system, including smart infrastructure.

FIG. 2 shows an illustrative example of a small portion of a traffic system, including smart infrastructure 203, 205, as well as repurposable signage 209. In this example, traffic is growing heavy in an easterly direction 213 on road 1, and this can be detected and reported by infrastructure unit 203. Westbound traffic on the same road 211 is not excessive at this time. It is noted, however, that the eastbound congestion may cause a delay in westbound traffic if vehicles attempt to make a left turn from road 211 onto road portion 217 of road 2. Thus, the traffic moving eastbound on 213 can have an indirect impact on the traffic of 211.

At the same time, road infrastructure unit 205 may report no traffic on road 2 215, 217 and minimal traffic on road 3 219, 221. If road 1 eastbound traffic and road 3 eastbound traffic can reach common destinations, the process can use the underflow of 219 to mitigate the overflow of 213. At the same time, the system may want to avoid increasing the traffic on 213. A number of actions can be taken in response to this overall snapshot (albeit a simplified sample of decision making).

To avoid 213 traffic impacting 211 traffic, the system 201 can decide to engage a temporary no left turn signal 209. This signal may be engaged until traffic clears on 213. Even though 211 vehicles turning left would not create new significant traffic on 219 or 221, the delay involved in turning through heavy traffic would potentially slow down and create traffic on 211. This decision may also be impacted by whether or not westbound 211 traffic can still reach the same destinations as westbound 221 traffic, for example (e.g., the turn may be a preferable, but not necessary, turn for most parties).

At the same time, although not shown, the system may temporarily engage a no right turn signal on road 221 leading to road 215. If vehicles on 221 wanted to turn right and then right again, to travel eastwards, the system might also temporarily allow u-turns (if safe) at the intersection of 221 and 215, so that vehicles could u-turn onto 219 to move eastward. Since 219 traffic is currently low, this maneuver, while potentially slowing of overall traffic, may have minimal impact.

Also, in this example, in order to incentivize traffic on 213 to travel on 219, the system can either force (through a temporary right turn only at the intersection of 213 and 217) traffic down 217 or add an incentive. Incentives can be in the form of toll-credits or other point or monetary compensation. Users who willingly use the incentive lanes may be able to use later toll-lanes for free or reduced pricing, and the offset for this reduction in cost is the fact that overall traffic flows in a controlled manner due to the voluntary actions of these parties. And, again, because the system considers the overall impact of each decision on a complicated system, engagement of traffic controls is much more able to accommodate end-goals of such a system (low overall traffic) as opposed to being driver centric (low overall travel time for one vehicle, despite overall cost to system).

The system 201 may also create and produce real-time maps with present rule changes, which can be delivered to and used by vehicle navigation systems, so that current navigation decisions are instructed by, aware of, and not in opposition to currently engaged traffic controls that may not always exist. More on navigation adaption to changing traffic rules will be discussed later herein.

Figure 3:
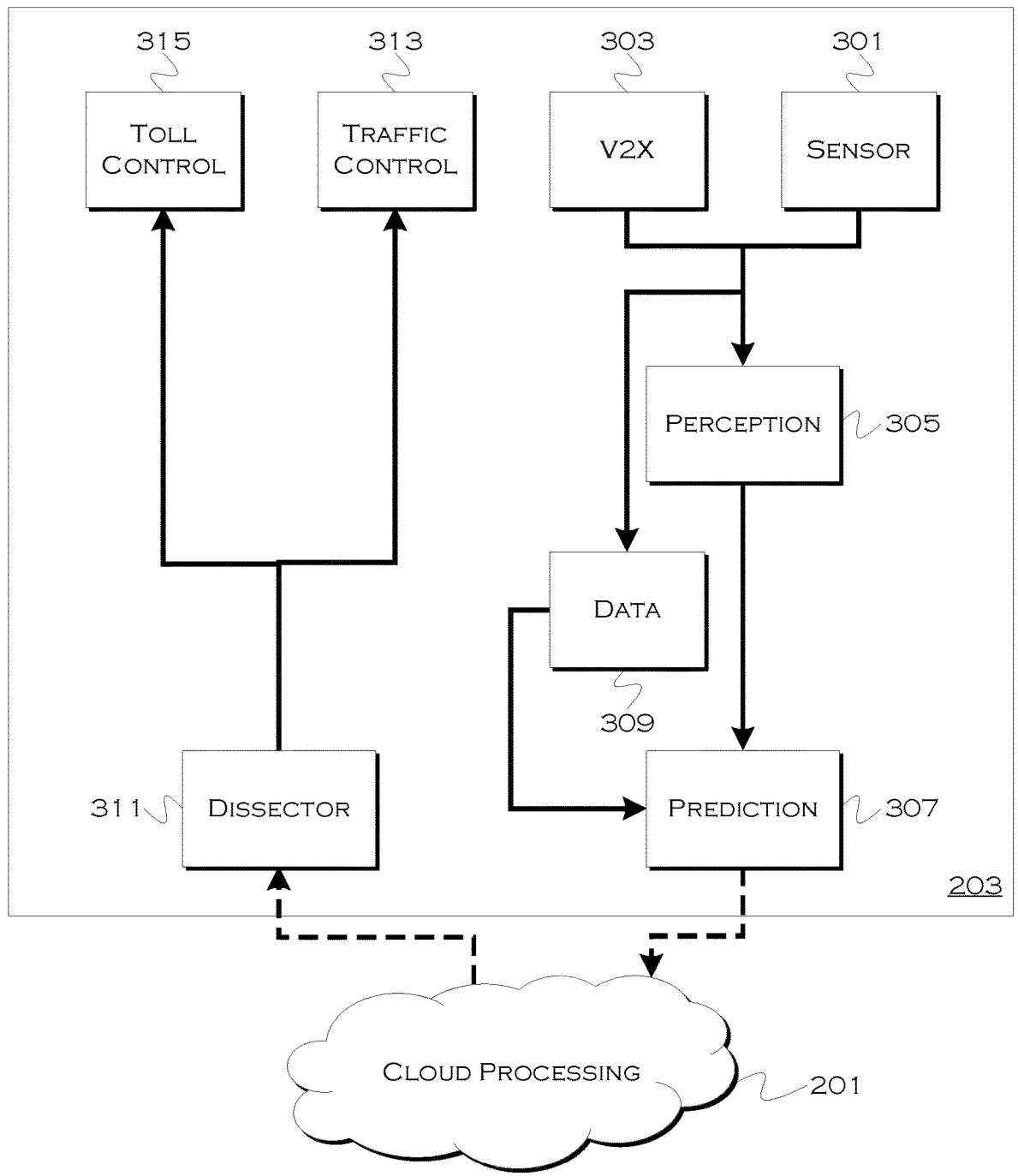
FIG. 3 shows an illustrative example of a system for intelligent infrastructure components.

FIG. 3 shows an illustrative example of a system for intelligent infrastructure components, which can be provided to facilitate localized rule changes and traffic-awareness for a given locality. In this example, the system may include a plurality of sensors 301, which can include, for example, cameras and other sensors for detecting flow and congestion of traffic. Vehicle to infrastructure (V2I) 303 components can communicate with the passing vehicles to obtain vehicle-specific data. This data may include, but is not limited to, vehicle ID, position, speed, heading, acceleration, route, etc. With regards to a vehicle route, for example, the system could obtain a complete route plan or a short-term route plan, which could include, for example, a planned route within a sphere of influence for a given infrastructure component, or a plan for a next-X-miles, etc. This can assist the system in knowing what given vehicles plan or need to accomplish and whether an alterative artery is reasonably suitable for a group of vehicles (e.g., will it route them 3 minutes out of the way or 30 minutes out of the way).

This data can be added to a big data repository 309 and that repository (which can demonstrate long-term historic observations) can be fused with present perception 305 (current conditions) to create overall predictions 307 about current traffic flow in the immediate term and near-term future. Present and predicted traffic for the locality is then sent to the cloud 201, where an overall plan for a number of infrastructure units can be derived. The cloud server can consider the impact of changing traffic at infrastructure location X on infrastructure location Y, and derive a plan that can accommodate both regions while minimizing impact.

This plan, or a portion of this plan, can be sent back to the infrastructure 203, and a dissector 311 can extract the portions of the plan relevant to the local controllable infrastructure units. The local infrastructure can then control signals 313 and tolls 315 in accordance with the plan. The plan may also include dynamic components, for example, "engage no-left turn until 40 vehicles have passed, then disengage for 20 vehicles, repeat until 5:45 PM." Since the local infrastructure component can track local traffic, it can accommodate such controls easily, without significant network traffic to a central server with all of the localized traffic data. The system can also adapt to an unexpected change in local traffic resulting from the controls or generally occurring, and the whole system may not need to replan the controls.

The overall system may attempt to minimize overall impact or minimize flow in a certain direction, and the goals of the overall system may be designed to benefit the whole group of vehicles, according to a plan, at the cost of potential inconvenience to a few vehicles. This is a much more efficient method for achieving improved traffic flow, than the traditional method of letting each vehicle self-plan avoidance routes without considering impact on the overall system. While vehicles can still freely navigate, they will be constrained by the new rules or changing rules, which effectively forces them to accommodate the system as a whole, at least to some extent. Unexpected behavior can also be accommodated from a long-term perspective, such as expecting vehicles to take the first left, when a control is engaged, but observing that most vehicles actually take the second left. Future planning can accommodate this as the expected result, so that the actual likely impact on the whole system can be adjusted accordingly. Thus, even if a control adjustment creates an unexpected delay for a day or two, the overall impact and control adjustment can adapt to accommodate the actual observed behavior over a long time period, and act to mitigate resulting impact.

Some current traffic controls may be used in conjunction with the illustrative embodiments with little to no modification. Lights, for example, may have adjustable control patterns that can be influenced by the local infrastructure units. It is worth noting that it is not necessary to have the local infrastructure units, and that a cloud system could gather all the data and cohesively adapt to the whole system, but this may require significant computing power and high network traffic of data, and that it may be more efficient to use a distributed model to locally observe and control traffic.

Other infrastructure components, such as physical signs, may need to be changed in order to be adjustable by an infrastructure control unit. For example, instead of a stop sign or a turn sign, a square LED or similar sign may be installed, which can be adjusted to serve as a stop sign, a yield sign, a turn sign, etc. While this may incur an initial cost, this may be quickly offset by the ability to adaptively change the sign to accommodate a variety of traffic needs. Even with the simple example of a stop sign that can be selectively engaged, it is easy to see how such a device can be disengaged to increase flow along a road or engaged to control flow to limit traffic accumulation further down the road. While not necessary, integration with navigation and attendant display units can further serve to keep users informed of these changing conditional signs. Since human drivers are already used to accommodating the displays on changing street lights, similarly changing traffic control signs should not be difficult to incorporate into driving decision-making.

Figure 4:
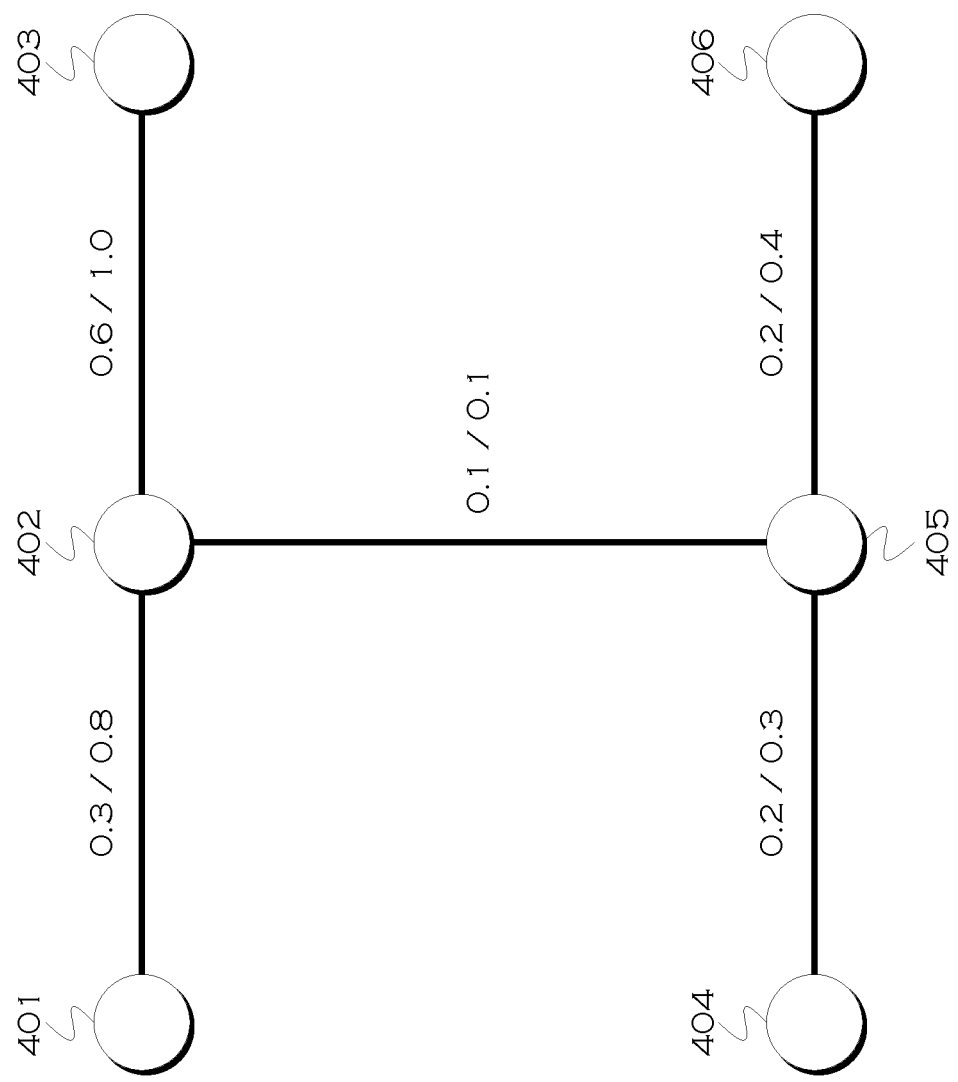
FIG. 4 shows an illustrative example of a process for solving traffic flow over a network.

FIG. 4 shows an illustrative diagram of traffic nodes showing a solving of traffic flow over a network. In this example, the process treats each intersection (or other defined point) as a node, in a point network graph, and considers the overall flow of traffic along each edge connecting the points, as well as the impact on the whole system that might result from a change in flow along one or more edges.

So, in this example, the process considers that between 401 and 402, traffic flow is at 0.3 westerly and 0.8 easterly. This graph corresponds to the image shown in FIG. 2. Traffic between 402 and 403 is also significant (1 out of 1) easterly and is heavier 0.6 westerly. At the same time, there is virtually no traffic (0.1 north and south) between 402 and 405, and there is minimal traffic along the stretch from 404 to 406 (including 405). Even before applying a formula, this graph shows that traffic should be reasonably routable down the path from 402 to 405, and will, at least for a time, not overload 405 to 406 or 405 to 404.

More generally speaking, a goal can be to solve a problem whereby the goal is to:

Minimize $\Sigma_{i,j \in N} p_{i,j}$;

Subject to $p_{i,j} < 1$; and $\cdot \Sigma_{i,j \in N} c_{i,j} \geq 0$

In this equation set, $p_{i,j}$ denote the possibility of the occurrence of traffic congestion. This can be evaluated according to the traffic density and the average traffic speed.

The traffic would occur between node i and node j, and $c_{i,j}$ represents a toll or bonus ($c_{i,j}>0$ means a toll between node i and node j, while $c_{i,j}<0$ implies bonus) used between i and j. Physically, the equation set attempts to minimize the total probability of the occurrence of traffic congestions while satisfying a condition that no roads are congested and to control the possibility of losing money for controlling traffic.

In instances where a sign control, as opposed to a bonus or toll is used, the value of setting the control can be observed in terms of expected impact in a relative (slowing control) or absolute (preventative control) sense. Conceptually, this is approximately equivalent to setting a toll so high or bonus so high that one could expect all or virtually all traffic to take advantage of the change. Game theory and/or numeric optimizer strategies can be used to solve for optimal control policies to maximize the whole node system or a certain portion of the node system. Policies, which may vary between strict controls and optional costs/bonuses, can be transmitted by the cloud optimizer to the various infrastructure systems to control the system accordingly in their sphere of influence. Changes to toll prices may also be considered to be engageable traffic control measures, the distinction was made in this paragraph for explanation purposes only.

For example, using the scenario described in FIG. 2, the infrastructure elements can monitor their respective spheres of influence, predict the likelihood of congestion, and transmit the results to a cloud server. In this case, the traffic forming on road 1, especially between nodes 402 and 403, the system may generate the following control policies (as an example):

Engage a no-left turn policy at node 402 for traffic traveling from 403 to 402. Increase the tolls for traveling past 402 in an easterly direction. Provide a bonus for travelers traveling from 401 to 402 to turn down the path from 402 to 405. If the traffic is eventually mitigated on the path from 402 to 403, the system can revert, and if traffic is not mitigated quickly enough, the system could further adapt to increase the bonus incentive or even engage a forced right turn for some easterly traffic traveling from 401 to 402, if the bonus was not having the desired effect. Because the system is also considering the impact on the overall system, the enacted changes should not have a deleterious effect on the 404 to 406 traffic flow, and if such an effect manifests, the process may revert or change incentives to accommodate the newly forming congestion.

Figure 5:
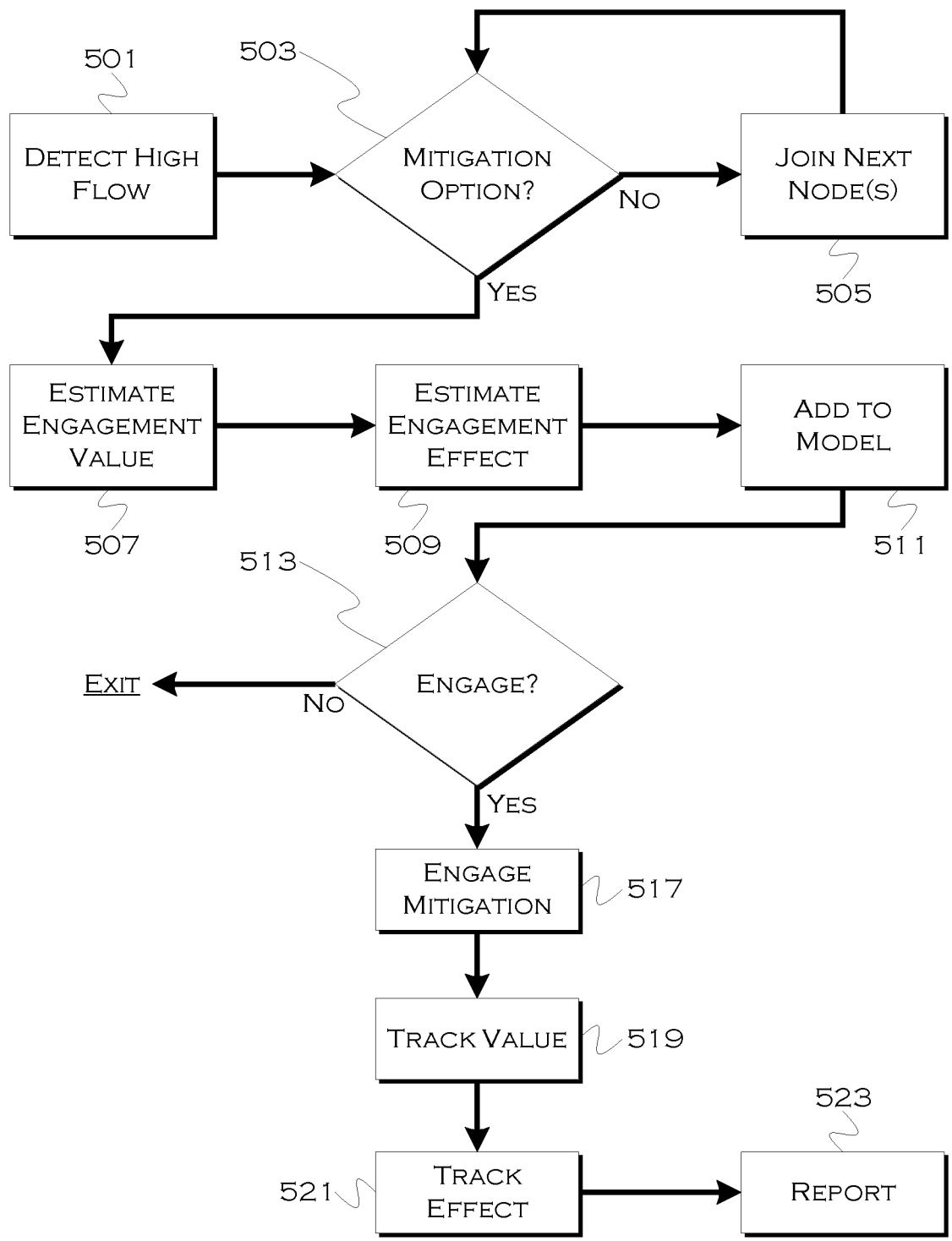
FIG. 5 shows an illustrative example of a process for modeling and planning changes over a given pair or set of nodes.

FIG. 5 shows an illustrative example of a process for modeling and planning changes over a given pair or set of nodes. In this example, the process detects 501 a high flow of traffic over a threshold limit, representing a system that may benefit from a change in traffic flow. This reaction can be in real time, to actual conditions, or may be a reaction to predicted conditions, which can be the result of historical analysis or the result of patterns indicating the likelihood of traffic forming. By reacting in advance to actual heavy traffic, the system may mitigate the likelihood of such traffic forming in the first place.

In this example, the process may determine 503 if a mitigation option (e.g., a control, bonus or toll option, exists that can effect a change in traffic flow over the given segment. If no present option exists (e.g., if there is no control which can predictively change flow for the segment), the process may join 505 a next-node in either direction, and continue to do so until a viable option for traffic control is observed. For example, if the road between 402 and 405 was unsuitable for using as an alternative artery, the process could choose a node prior to 401 (not shown) and use that node as a control point to control easterly traffic on the stretch from 401 to 403.

When a suitable or possible control exists, the process may then estimate 507 an engagement value (effect on overall flow) achievable from engaging one or a variety of controls available. For example, in the illustrative example shown in FIG. 2, the process could consider the value of engaging both the no left turn sign and the increased incentive to travel from 402 to 405. While the traffic moving westerly on 403 to 401 is of medium volume, the cost of left turns onto 402 to 405 may have a deleterious impact on both the 401 to 403 traffic and the 403 to 401 traffic. Since the system is already trying to minimize the impact on 401 to 403, this control may serve to improve (moderately) the impact from left-turning vehicles.

At the same time, the impact of providing a value to turning right on 402 to 405, may be decided to be worth the cost. Thus, the value 507 can be observed in terms of how traffic is expected to change relative to any cost, and the effect 509 can be observed in terms of how traffic is expected to change on other segments such as 404 to 406. The relative cost to the city or a road operator can be considered against the relative value of improving flow on 402 to 403 and the overall impact to the whole system 401 to 406, and the optimization process can determine if the use of the control is a reasonable option. Whether or not an option is reasonable may also be constrained by a particular locality's (e.g., a city's) preference for spending resources (toll bonuses, for example) in exchange for diminished traffic congestion.

The process can add 511 the proposed control, along with the attendant costs, benefits and effects, to an overall model for a larger network, and then the system can determine if the particular control should be engaged 513. An eventual plan, including engagement or conditional engagement (e.g., engage but only if) can be distributed to various infrastructure units for localized processing.

In this example, that can include delivering the solution to the V2X components shown in FIG. 2, and the component 203 can engage 517 the controls shown, at least until traffic from 402 to 403 diminishes. Since the system works largely on predicted results, the local infrastructure unit can also track changes resulting from engaging the control. This can include tracking the value 519 (both in terms of cost and mitigation of traffic from 402 to 403) and tracking the effect 521 on other segments, such as how much the traffic on 402 to 405 and/or over the 404 to 406 stretch changes. The system can report 523 this data to demonstrate how useful the control was at the given time under the given conditions. This data can then be used immediately and/or in the future to make changes to a control plan, as a better understanding of the actual cost, value and impact is observed.

For example, if the no left turn resulted in increased congestion past 401 in a westerly direction, the system may permit left turns, despite the impact on 402 to 403 congestion, to mitigate a worse effect west of 401. So, in the future, under similar conditions, the system may elect not to engage the no left turn, even though this will deleterious impact the 401 to 403 traffic, because the overall effect on the system is diminished by preventing excessive traffic west of 401.

Figure 6:
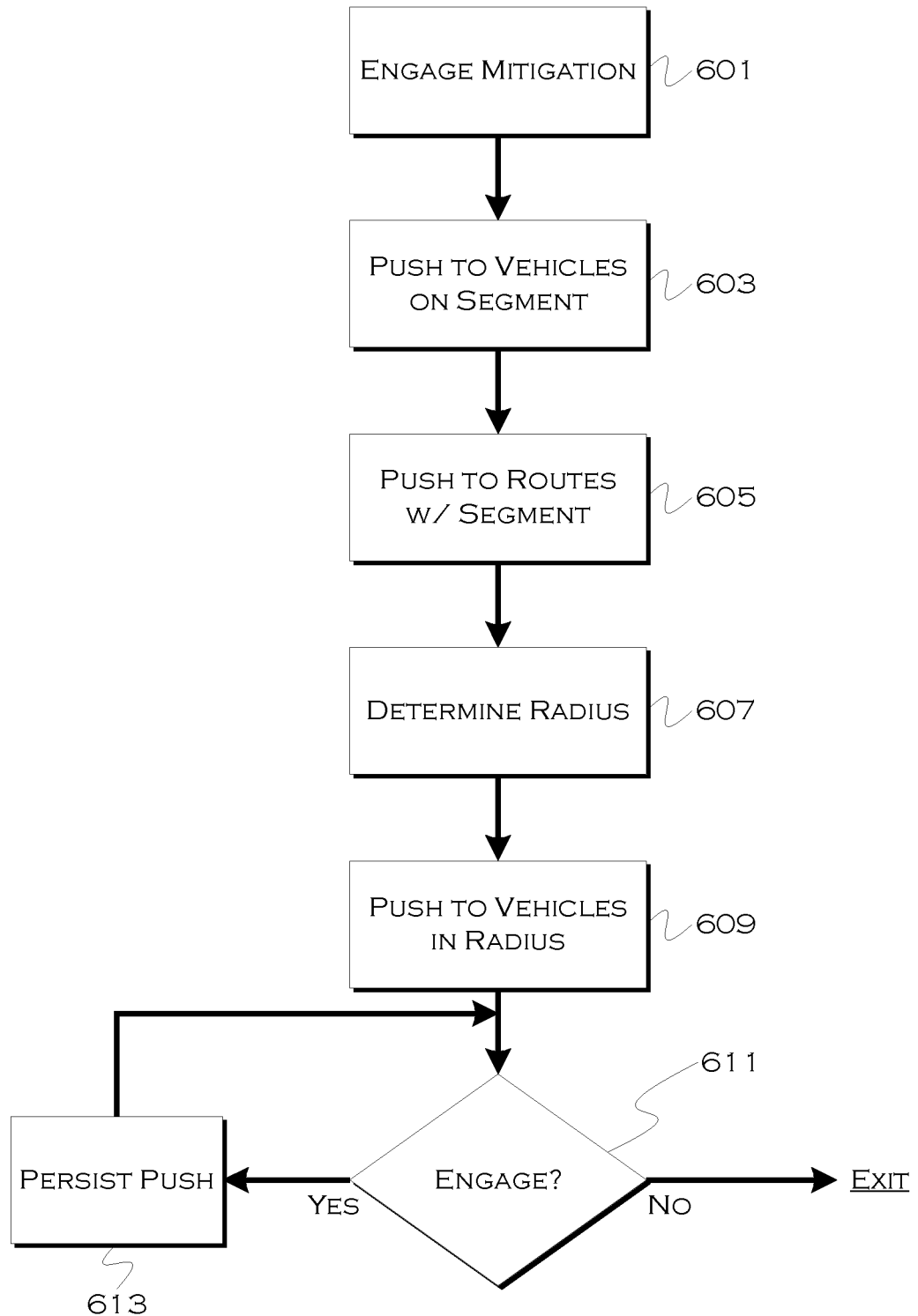
FIG. 6 shows an illustrative example of a process for delivering infrastructure control changes to vehicle navigation systems.

FIG. 6 shows an illustrative example of a process for delivering infrastructure control changes to vehicle navigation systems. While it is certainly possible to push or deliver all changes to all infrastructure to all vehicles on the road, this may be a highly inefficient process, because it is unlikely that a vehicle 150 miles from a newly engaged no left turn sign will have any reason to need to know about the change.

This would also require an absurd volume of network traffic, if the system was constantly changing controls and had to tell every vehicle on the road about these changes.

In this example, one non-limiting process for informing vehicles that might reasonably be expected to be impacted by a change, is shown. Once the system engages 601 a mitigation measure (e.g., without limitation, no turn, increased toll, bonus, etc.), the system can immediately push 603 this information to all vehicles on segments connected to the control, or all segments within X-hops (a hop being node to node travel) of the effected segment. This is a fast way of getting the information to vehicles which may be immediately impacted, but which also may have planned a navigation route prior to control enactment, and thus may need to know about the change because it may affect a present route.

The process also pushes 605 change to all vehicles including an effected segment in a present route. Thus, even if one is 10 miles away, but one is planning on traveling down the effected segment, one's vehicle might receive the change. This can allow for long-range adaptive navigation strategy for an individual vehicle, which might need time to accommodate the change in an efficient (from a planning perspective) manner. That is, if the vehicle did not know about the change until it was on the segment, it may require a 10 minute detour, but had the vehicle known in advance, it might only require a 5 minute detour down a path that does not even include the segment.

Next, in this example, the process may determine 607 a radius. This can be a range, out from the change, wherein all vehicles not yet notified will be immediately and/or persistently notified of the change. For example, if the change was designated for 30 minutes, the radius could be defined by all points reasonably reachable within 30 minutes of travel from the change. As the remaining time diminished, the persistence of the data delivery could diminish in radius accordingly, to minimize network traffic while still attempting to ensure adequate delivery of data. The process, such as the cloud, can continue to push 609 the data to any new vehicles within the radius. Changes in planned control activation duration can thus easily be accommodated by varying the radius, and some form of the data delivery can persist 613 as long as the control 611 continues to be engaged.

Figure 7:
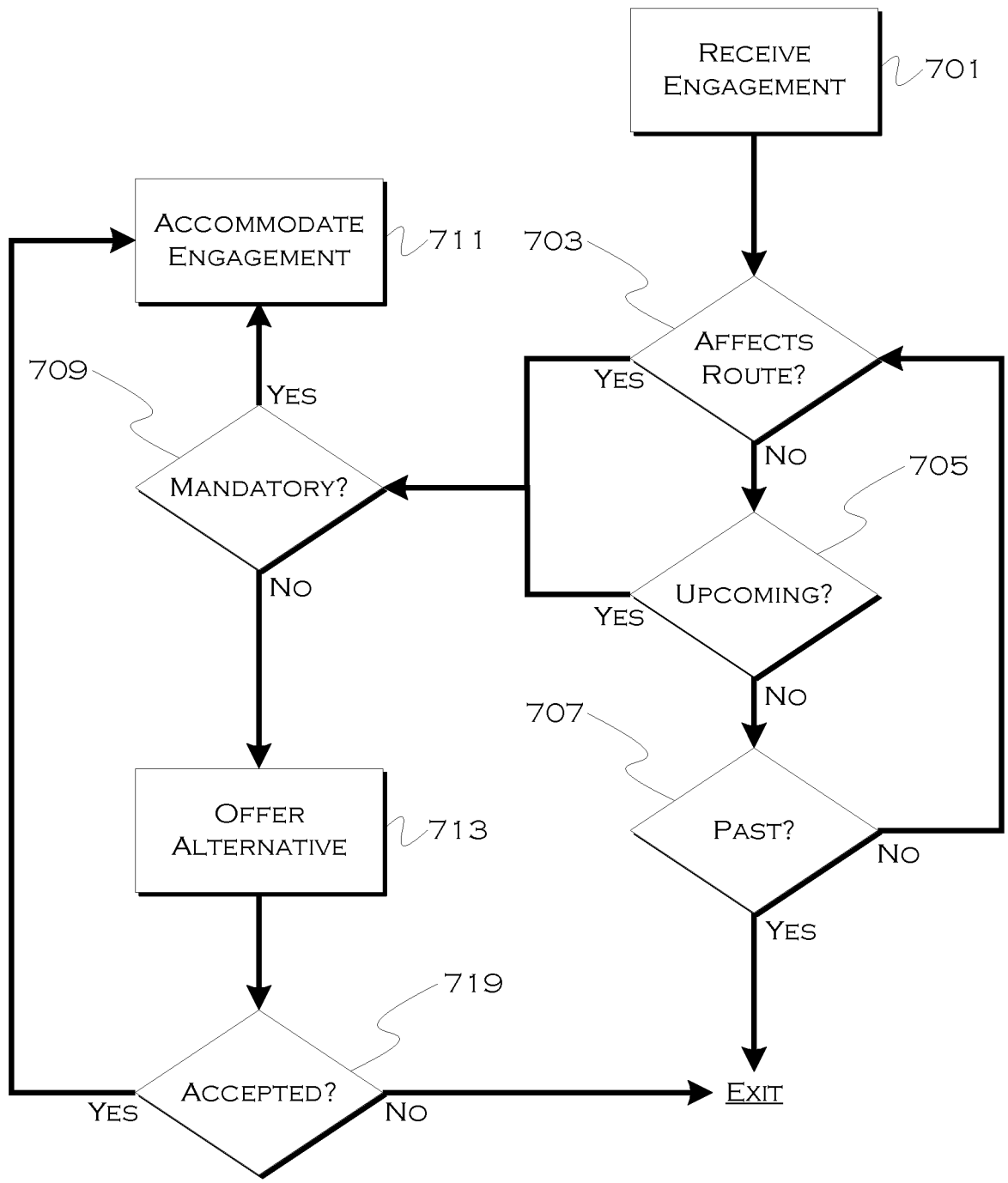
FIG. 7 shows an illustrative process for handling control changes in a vehicle navigation system.

FIG. 7 shows an illustrative process for handling control changes in a vehicle navigation system. In this illustrative process, a given vehicle may receive 701 notification that a given control has been changed. Since the vehicle may be on a segment affected by the control, have a route with a segment affected by the control, or may just be in a general radius or distance of the change (as non-limiting examples of why a vehicle may receive a control change), the process may also determine if a given vehicle is actually affected by the control. This can include, for example, determining 703 if a current route is affected by the control (e.g., can a planned turn no longer be made) or if a control change is upcoming 705 for a vehicle without a defined route. In the latter case, the driver may be intending a turn and may benefit from knowing that the turn is not presently possible (or an unplanned turn may now be incentivized or required).

This consideration of the effect may continue until the vehicle is past 707 the control point, at which point the control should presumably no longer affect the vehicle. In the "route affecting" instance, the driver may be given notice well in advance of the control, and have an option to route around the control if the resulting on-site alternative would be less desirable (e.g. "a no turn sign has been engaged, rerouting now will result in a 5 minute delay, rerouting on-site will result in a 10 minute delay, would you like to reroute now?"). Since the control may no longer exist by the time the driver arrives, the driver can electively plan which option to take, or choose to stop for food or gas, giving the control time to expire.

In the "upcoming" example, the driver may have less notice, since the vehicle does not actually know whether the driver will be affected by the planned change. In this instance, the system may notify the driver when the driver's position and/or heading indicates that the control may be encountered (e.g., "a new no turn sign has been engaged for left turns onto Haggerty from Pontiac Trail, would you like an alternative temporary detour route for getting to Haggerty from Pontiac Trail?"). The preceding may be delivered while the driver is already on Pontiac Trail and planning a turn onto Haggerty, but at least this option can provide the driver with a route-alternative, even if a whole route is not planned.

The system can consider whether an engaged signal is mandatory 709 or optional. In the optional scenario, the driver can choose to ignore the signal (an incentive based option) or can have an alternative route avoiding the signal planned. Thus, if the signal will not necessarily affect the driver, the process can offer 713 an alternative route, or even offer a route including a new road in exchange for an incentive, even if the new route is longer (e.g., "there is a $1 incentive for turning right onto Ford Road, this will add three minutes to your journey, would you like to use the alternative route including this incentive?"). If the driver accepts 719 the option, the process may accommodate the engagement of the control by planning a new route avoiding or including the control (depending on the basis for route-acceptance).

In some instances the control will be unavoidable, such as a forced right turn when no other options are possible and the user had planned to go straight. In these instances, the system can automatically plan a new route. This "mandatory" determination can also be made while the control is not technically presently mandatory, in the sense that if the user persists on a current route, the user will necessarily be affected by the control, and this will result in a 20 minute detour, whereas by immediately re-routing, a 7 minute detour can be achieved. In such a situation, the system may offer the alternative or may simply reroute to optimize travel time, which decision can also be dictated by user configurable rules (e.g., "if the mandatory detour delay delta is greater than X minutes from a present detour delay, automatically use the present detour.")

In other instances, the control effect is literally unavoidable (without illegally leaving a road or immediately stopping and waiting for the control to expire), and in those instances the system can adapt to provide a new route in compliance with the changed control and accommodating a user plan.

By providing dynamic, adaptable traffic controls that both serve to change traffic patterns and accommodate an optimized whole-system, as opposed to vehicle-centric decision making without regard for overall impact, the illustrative embodiments can serve to manage traffic and move the whole traffic system more efficiently than localized, decoupled control system and/or reliance on individuals to personally re-route.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined in logical manners to produce situationally suitable variations of embodiments described herein.

What is claimed is:

1. A system comprising:
a processor configured to:
receive congestion data for a plurality of road segments, representing edges in a node graph representative of a road network, wherein nodes in the graph comprise intersections;
solve an equation for the node graph to constrain congestion over the whole graph according to a predefined goal and considering the impact of engageable temporary traffic control measures to derive a solution; and
send control instructions to a plurality of the temporary traffic control measures that are identified as those to be engaged in order to achieve the solution, wherein the control instructions include an expected effect of the control measure, including at least observed rerouting of at least a predefined number of vehicles onto a predefined segment, and wherein the instructions further include termination instructions if a local observation unit, in communication with the control measure, observes the expected effect having occurred.

2. The system of claim 1, wherein the impact on the solution, of engaging a given temporary traffic control measure, is determined based on historical changes observed to result from engaging the given temporary traffic control measure.

3. The system of claim 1, wherein the impact on the solution, of engaging a given temporary traffic control measure, is determined based on historical changes observed to result from engaging other temporary traffic control measures of a same type as the given temporary traffic control measure.

4. The system of claim 1, wherein the predefined goal includes minimizing the sum of all resulting congestion, represented on a fixed scale per segment, over the node graph, the resulting congestion being congestion predicted to exist following engagement of a given one or more of the temporary traffic control measures.

5. The system of claim 1, wherein the temporary traffic controls include a temporary no-turn signal.

6. The system of claim 1, wherein the temporary traffic controls include a temporary stop-sign.

7. The system of claim 1, wherein the temporary traffic controls include a temporary toll price change.

8. The system of claim 1, wherein the control instructions include a predefined duration for engagement of the control measure.

9. The system of claim 1, wherein the expected effect includes a decrease of congestion on a predefined segment below a predefined level.

* * * * *